United States Patent [19]
Sampsell et al.

[11] Patent Number: 5,323,002
[45] Date of Patent: Jun. 21, 1994

[54] SPATIAL LIGHT MODULATOR BASED OPTICAL CALIBRATION SYSTEM

[75] Inventors: Jeffrey B. Sampsell, Plano; James M. Florence, Richardson, both of Tex.

[73] Assignee: Texas Instruments Incorporated, Dallas, Tex.

[21] Appl. No.: 73,637

[22] Filed: Jun. 8, 1993

Related U.S. Application Data

[63] Continuation of Ser. No. 857,149, Mar. 25, 1992, abandoned.

[51] Int. Cl.$^5$ .............................................. G01M 11/02
[52] U.S. Cl. .................... 250/252.1; 250/332; 250/504 R; 250/493.1; 356/243
[58] Field of Search ............ 250/252.1 A, 504 R, 250/493.1, 332; 356/243

[56] References Cited

U.S. PATENT DOCUMENTS

| | | | |
|---|---|---|---|
| 4,419,692 | 12/1983 | Modisette et al. | 358/113 |
| 4,815,799 | 3/1989 | Goldstein et al. | 350/1.1 |
| 4,876,453 | 10/1989 | Wirick | 250/252.1 A |
| 4,948,964 | 8/1990 | Gohlke | 250/350 |
| 5,030,005 | 7/1991 | Swope et al. | 250/252.1 A |

FOREIGN PATENT DOCUMENTS

| | | |
|---|---|---|
| 0391529A3 | 2/1990 | European Pat. Off. |
| 3429410 | 2/1986 | Fed. Rep. of Germany ... 250/252.1 A |

OTHER PUBLICATIONS

Grinberg et al., "Visible-to-Infrared Image Converter for Dynamic Infrared Target Simulation Applications", Proc. Soc. Photo-Opt. Instrum., SPIE, vol. 226, 1980, pp. 129–132.

Stauffer, et al., "Thermal Scene Projectors Using Microemitters", *Optical Engineering*, vol. 30, No. 11, Nov. 1991, Bellingham, Wash., pp. 1664–1667.

*Primary Examiner*—Carolyn E. Fields
*Attorney, Agent, or Firm*—Julie L. Reed; James C. Kesterson; Richard L. Donaldson

[57] ABSTRACT

A method and system for calibration of optical systems is disclosed. The system consists of a reference source (12), a spatial light modulator (26) for transmitting the reference source signal through non-imaging optics (30) and into the input of an optical system (36). The output of the optical system is then compared to the input signal and a correction is derived. The correction is stored and used real-time to adjust the output of the system to more accurately reflect the actual input signal.

17 Claims, 2 Drawing Sheets

SPATIAL LIGHT MODULATOR BASED OPTICAL CALIBRATION SYSTEM

This application is a continuation of application Ser. No. 07/857,149, filed Mar. 25, 1992, now abandoned.

BACKGROUND OF THE INVENTION

1. Field of the Invention

This invention relates to optical systems, more particularly a method of calibrating such systems.

2. Background of the Invention

Certain optical systems require calibration for optimal performance. For example, systems with sensors, such as Forward-Looking Infrared (FLIR) detection systems, vary in responsivity over time and from pixel to pixel. To overcome this, the operators typically perform some type of calibration. The calibration allows a correction to the sensor reading before the data appears on a display, making the reading more accurate.

This concept applies to other types of systems. Systems that receive scenes in color can use this calibration to adjust for color brightness, balance, and saturation. Similarly, black and white systems could use it to adjust grey-scale readings or outputs.

Problems exist in the current ways calibration occurs. Calibration systems require longer periods of time than desired by the operators. These systems or circuits normally take up quite a bit of space, and use more power than desired. Another significant problem resides in the uniformity of the reference source into the system, and the difficulty of isolating the reference from the sensor during normal operation.

In a FLIR, for example, the calibration occurs using a reference source that has two known temperatures. The temperature mix travels through non-imaging optics to the system sensors. The sensor reads the mix and produces a temperature reading. The difficulty lies in controlling the mix of the two temperatures.

SUMMARY OF THE INVENTION

The present invention disclosed herein comprises a system and method for calibration of heat-sensing systems, such as infrared and optical sensors, color systems, and other optical systems that desire calibration. The reference is set to a known combination of discrete temperatures or colors. The spatial light modulator controls the mixture of these temperatures or colors and transmits it uniformly into the system awaiting calibration. The actual input versus the resulting output results in a correction for each pixel for a more accurate result when the system operates on unknown inputs.

BRIEF DESCRIPTION OF THE DRAWINGS

For a more complete understanding of the present invention and for further advantages thereof, reference is now made to the following Detailed Description taken in conjunction with the accompanying drawings in which.

DETAILED DESCRIPTION OF THE PREFERRED EMBODIMENTS

Figure 1:
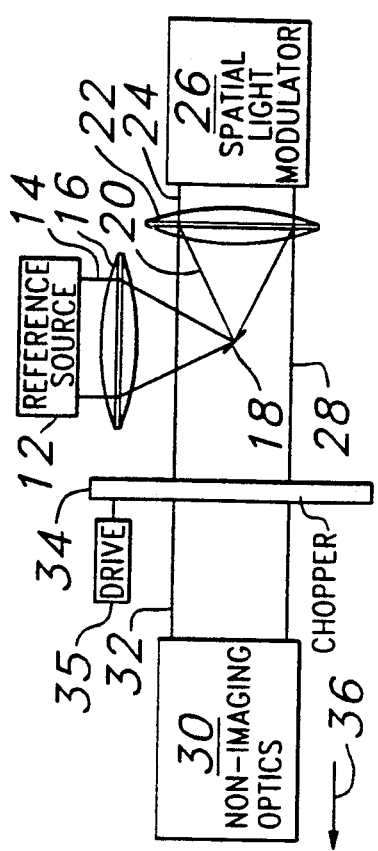
FIG. 1 shows a system used to generate a known input for calibration.

FIG. 1 shows a top view of the calibration system before the signals enter the optical system. Reference source 12 outputs some known signal, possibly a combination of discrete temperatures or colors. The light carrying known signal travels along path 14 to lens element 16. Lens 16 transmits the light to optical projection stop 18, a fold mirror, as an example. The light reflects off the stop 18 along path 20 to lens element 22. The lens element 22 images the light onto a spatial light modulator 26 via path 24. If the spatial light modulator is active, the light will reflect from it and miss the stop 18, travelling along path 24 to path 28. If the spatial light modulator is inactive, the light will reflect as if off a flat mirror and return to the source via paths 24, 20, and 14.

An active spatial light modulator, such as a reflecting liquid crystal cell, or a membrane deformable mirror device (DMD) will diffuse the light around or pass it through the stop 18 and allow it to impinge upon chopper 34. This offers additional control over the transmission to the non-imaging optics 30. A disk with a wedge taken out and a drive motor or coil 35 often comprise a chopper. The non-imaging optics could consist of many things, such as a ground glass panel. They may also involve some imaging optics such as a lens before the panel, depending upon the application.

In a system such as a FLIR, the non-imaging optics diffuse the image of the reference source to produce a more uniform mix of temperatures for the system under calibration. After passing through the non-imaging optics, the light travels to the optics of the system. Finally, the calibration signal travels to the optics of the system under calibration in the direction of arrow 36.

Figure 2:
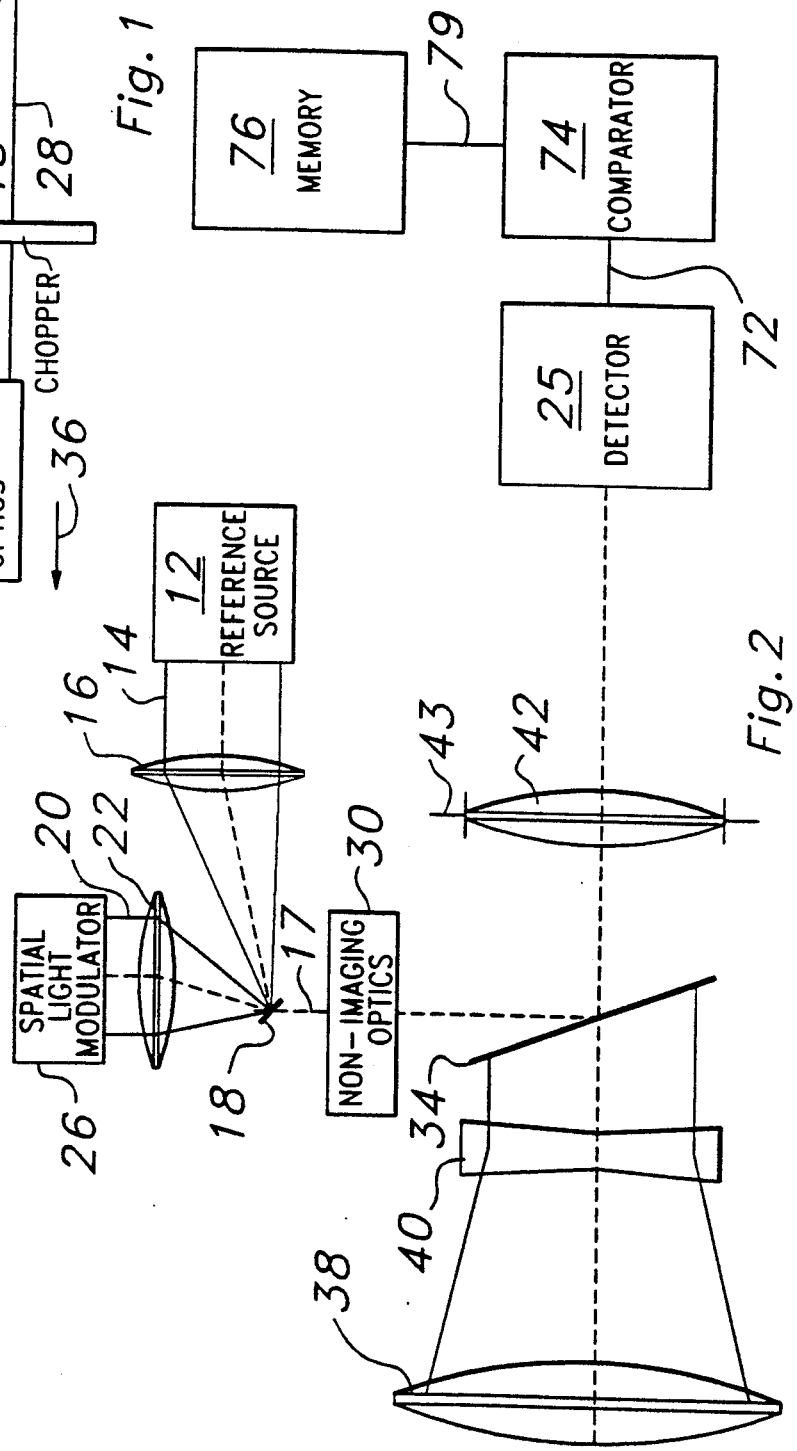
FIG. 2 shows a system to calibrate a staring array.

A staring array system is shown in FIG. 2. A staring array could be a FLIR or any sensor system that "stares" at a scene. The scene enters the system via collecting lens 38. Possibly some type of relay lens 40 could be used to pass the image to the detector. Chopper 34 regulates when the detector 25 and its imaging lens 42 receives the image. If the calibration is to be done off-line, the chopper could be activated to prevent the detector 25 from receiving any light from the lenses 38 and 40. The dotted line 17 represents the optical axes of the system, and to further clarify the relationship between the different modules of the system.

The calibration system consists of reference source 12, which is imaged onto the DMD 26 by the lenses 16 and 22, along paths 14 and 20. Light reflects off projection stop 18 and travels through lens 22 to the deformable mirror device 26. Again, as in FIG. 1, if the membrane is activated, light will pass the projection stop 18, travel through the non-imaging optics 30 and travel into the pupil of the imaging system of the detector.

The imaging system of the detector is shown here as only one element 42. In this case, the pupil of the imaging system is as shown, 43. The pupil of an optical system is the limiting aperture, either physical or effective, through which all of the light that forms an image passes. Light from each object point passes through every part of the pupil, and each image point receives light from every part of the pupil. Thus, in a sensor system, every detector element receives energy from every part of the pupil. The important aspect of imaging the calibration signal into the pupil is that every detector will then receive exactly the same mixture of signals from the discrete calibration sources. After passing through the pupil, the calibration signal passes to the detector 25. The output signal 72 of detector 25 is measured by comparator 74. After deriving a correction for a pixel, the correction is stored in memory 76. During normal operation the processor corrects readings from the detector using the correction stored in memory.

Figures 3, 4:
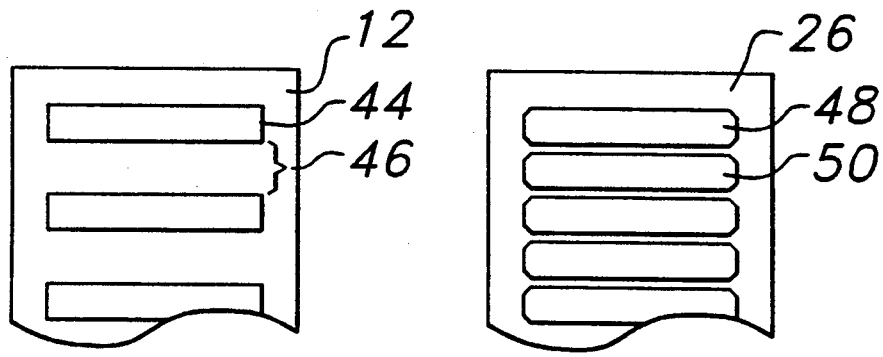
FIG. 3 shows a reference source.
FIG. 4 shows a membrane DMD designed for uniform mixing of the reference source.

FIG. 3 shows an enlargement of the reference source 12. The reference source can send any mixture of signals desired. One such possibility, such as in the FLIR application, has a cold background 46, with hot bars 44. The cold background stays at $T_1$ and the hot bar has a temperature of $T_2$. A uniform mix of these would result in a known temperature into the system. Alternately, the bars 44 may consist of a color, such as red, and the background 46 as blue, both shades of known wavelengths. If the designer uses a fast-enough processor, or can develop a correction scheme that does not require real-time adjustment, the calibration system could use three colors, such as red, green and blue. The output of the calibration system must have a uniformity that allows the operator to rely on the known input.

A spatial light modulator can perform this function. Typically, spatial light modulators consist of individual cells or lines that can be independently controlled. When the image of the reference source with bars 44 arrives at the spatial light modulator, the spatial light modulator can separate the two types of input from each other and re-mix them. Using the previous example of $T_1$ and $T_2$, one can see in FIG. 4 that every other line on the modulator 26, starting with line 48, corresponds to hot bars at $T_2$. Every other line, starting with line 50, corresponds to the cold background 46. All of the lines corresponding to hot act together, as do the lines corresponding to cold. In this way, the operator can transmit a known mix of the two temperatures to the non-imaging optics that further diffuses the mix, making it more uniform. Additionally, the reference source may consist of the set up previously mentioned, with hot bars on a cold background. The modulator would speed the process of calibrating one temperature at a time. The lines corresponding to the hot could become active and the system would only receive the hot temperature. With a quick switch in the addressing of the modulator, the cold temperature travels to the system.

Either way, it is relatively easy using a spatial light modulator to determine a known mix of either color or heat and to derive a two point correction for each pixel. One type of spatial light modulator fits the requirements of this method of calibration very well. The membrane type deformable mirror type typically consists of a metal membrane on top of supports. The supports allow the membrane to deflect towards addressing circuitry under the membrane by separating the membrane from the circuitry with an air gap. When the electrodes becomes active, the membrane deflects towards it, deforming, and incident light reflects at an angle. The support material typically consists of a polymer, such as photoresist. How the polymer is etched, as determined by the access holes etched in the membrane, determines in what pattern the membrane deflects. Other types of modulators can meet the requirements, such as liquid crystal cells, thin film modulators and electro-optic crystals, as well as digital micromirror devices (also known as DMDs). The digital micromirror is very similar to deformable mirror devices, except the membrane has been replaced by an array of individual mirrors suspended on supports over the electrodes, and each mirror has at least one dedicated electrode.

Figure 5:
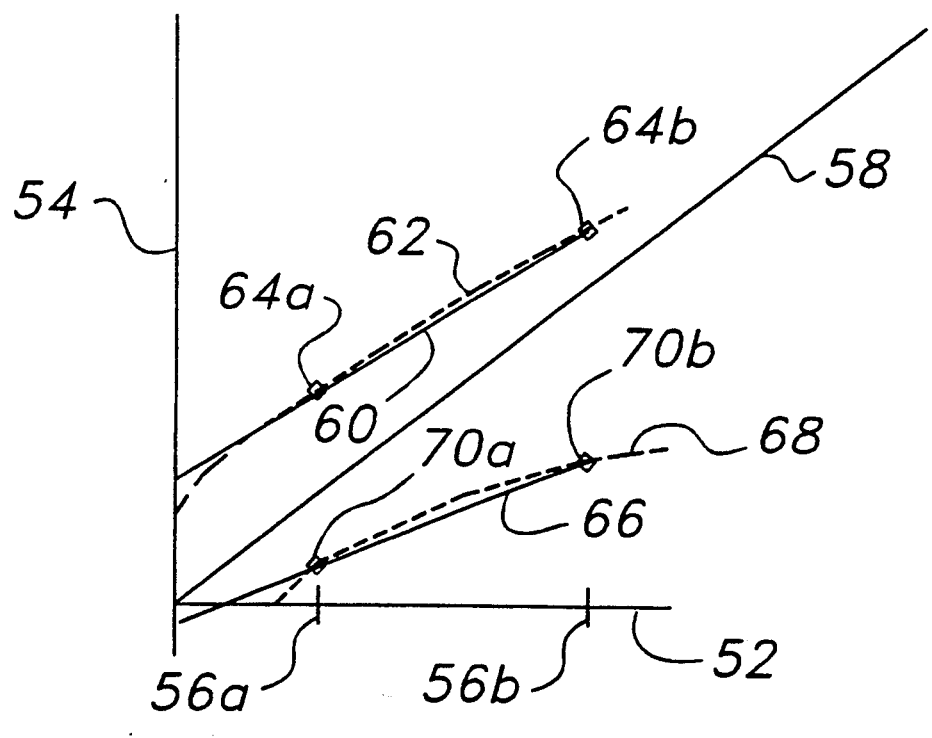
FIG. 5 graphs a possible correction line for pixels in the calibrated system.

A correction calculation example is in FIG. 5. The horizontal axis 52 represents temperature, with demarcations for mix 1, 56a, and mix 2, 56b. The vertical axis represents the output. The upper curve 62 represents the actual readings for a pixel that for discussion will be called pixel N. The curve is derived by taking the output readings for pixel N at the two marked temperatures, point 64a and 64b. Line 58 represents the perfect pixel response. Line 60 is the correction line for pixel N. Typically, the correction is taken by comparing the pixel N response to the perfect pixel response. This makes for a correction that is less accurate than desired. By drawing a line through the points 64a and 64b, the calibration system derives a two-point correction for pixel N. The line 60 takes the equation $y = mx + b$, where y is the output read, m is the slope of the line, and b is the intercept. The actual input, then, is $(y-b)/m$, where x is the actual input.

This two-point correction gives a more accurate correction than the original comparison against the perfect pixel response. A second example is shown is curve 68 with points 70a and 70b. The line 66 represents the correction for another pixel, pixel N+1. The calibration system stores these corrections on a pixel-by-pixel basis and uses them to correct the output of the sensor before displaying the data. The example used above mentioned and traced the use for FLIRs, but again could apply to any optical system desiring correction. As mentioned previously, the system could use three or more values, depending mostly upon the speed of the processor for making multiple-point corrections in real-time. The more data points available, the more accurate the correction. For example, a color system may use red, green, or blue, or a monochrome system may use different levels of grey-scale.

Another application could be an automated color tuner for television sets. The user flips a switch for calibration of the color system, the system activates sensors and compares the actual color sensed to the color input and stores the corrections. Alternately, the calibration system could always be on, using one part of the input signal as the reference source, detecting any differences at the output and adjusting for it automatically. When the system completes the calibration task, the resulting picture has better color saturation and brightness, possibly even better than the user could do alone. Many other systems could benefit, such as monochrome and color monitors, copiers in adjusting grey-scale values or colors, and printing systems.

The system to make and store this correction could be as simple as a comparator comparing values between two photosensitive detectors, where there is one detector for the input to the system and one detector to the output of the system. The correction derived from the comparison could then be stored in some sort of memory, such as a mapping table. When the system resumes normal operation, or if it has been operating normally with the calibration system on, the mapping table will provide the information to correct the output of the system for accurate presentation of the input.

Thus, although there has been described to this point particular embodiments of a method and system for calibration of optical systems it is not intended that such specific references be considered as limitations upon the scope of this invention except in-so-far as set forth in the following claims.

What is claimed is:

1. An optical system comprising:
   a. a reference source with at least one reference output signal wherein the value of the reference output signal is known;
   b. a spatial light modulator for selectively directing said reference output signal from said reference source to non-imaging optics wherein said non-imaging optics uniformly transmit said reference output signal to the input of said optical system;
   c. an output signal from said optical system; and
   d. a means for comparing the input of said optical system and the output of said optical system, deriving a correction based upon that comparison and storing it.

2. The system of claim 1 wherein said system is an infrared system.

3. The system of claim 1 wherein said system is a visual display system.

4. The system of claim 1 wherein said system is a photocopier system.

5. The system of claim 1 wherein said system is a printer.

6. The system of claim 1 wherein said reference source is a temperature source.

7. The system of claim 1 wherein said reference source is a color source.

8. The system of claim 1 wherein said reference source is monochrome.

9. The system of claim 1 wherein said spatial light modulator is a deformable mirror device.

10. A method of calibrating an optical system comprising:
    a. providing a reference source with at least one reference output, wherein the value of said reference output is known;
    b. transmitting an image of the reference output to non-imaging optics with a spatial light modulator;
    c. uniformly transmitting an image of the reference output through said non-imaging optics to the input of an optical system;
    d. creating an output signal with said optical system;
    e. comparing the reference output signal with the optical system output signal; and
    f. deriving and storing a correction for said optical system.

11. The method of claim 10 wherein said comparing step further comprises using a comparator to compare between at least two photodetectors.

12. The method of claim 10 wherein said deriving and storing step further comprises the use of a memory table for storing said correction.

13. A method of operating a display system comprising:
    a. providing a calibration system, wherein said calibration system further comprises:
        i. establishing a reference source;
        ii. operating a spatial light modulator for transmitting an image of said reference source; and
        iii. transmitting said image of said reference source from said spatial light modulator to non-imaging optics wherein said non-imaging optics transmit said image uniformly to the input of said display system;
    b. comparing said input of said display system with the output of said display system;
    c. deriving a correction for each pixel at said output of said display system; and
    d. storing said correction.

14. The method of claim 13 wherein said spatial light modulator is a deformable mirror device.

15. The method of claim 13 wherein said spatial light modulator is a liquid crystal array.

16. The method of claim 13 wherein said calibration system can be turned off and on.

17. The method of claim 13 wherein said calibration system is in continuous operation.

* * * * *